Aug. 31, 1943.　　　　N. P. BACH　　　　2,327,986
CAN CLEANING DEVICE
Filed March 5, 1941

INVENTOR.
Neils P. Bach
BY Ivan D. Thornburgh
Chas. H. Ernie
ATTORNEYS

Patented Aug. 31, 1943

2,327,986

UNITED STATES PATENT OFFICE 2,327,986

CAN CLEANING DEVICE

Neils P. Bach, Geneva, N. Y., assignor to American Can Company, New York, N. Y., a corporation of New Jersey Application March 5, 1941, Serial No. 381,913

6 Claims. (Cl. 15—213)

The present invention relates to a container or can cleaning device and has particular reference to dislodging solder pellets and to removing flux which may cling to the inside surface of the can.

In the manufacture of sheet metal cans, solder pellets and sometimes flux used in soldering the side seam often inadvertently collect inside the can body during the seam soldering operation. Obviously such foreign matter must be removed from the can before it is used. Many methods and devices have been tried to quickly and economically remove such foreign matter without scratching the inside surface of the can and when this surface is coated with enamel or the like substance the problem of freeing the can of this foreign matter is considerably increased.

The instant invention contemplates overcoming this difficulty by providing a rotating brush having radial blades which gently press against the inside of the can body when the brush is rotated to dislodge the solder pellets and to clean the can of accumulated dirt or flux.

An object therefore of the invention is the provision in a can cleaning device of a rotatable brush wherein radial blades insertable into a can to be cleaned gently engage against and sweep clean of foreign matter the inside surface of the can body in a manner which leaves the surface free of scratches or other damage so as to maintain the continuity of any protective coating used in the can.

Another object is the provision of such a cleaning device which will readily dislodge solder pellets from the inside of the can without scratching the can and at the same time clean the surface of other foreign matter such as flux, accumulated dirt or the like.

Another object is the provision of a cleaning device of this character which is simple in construction and economical to make so that the wearing parts may be readily and frequently replaced.

Numerous other objects and advantages of the invention will be apparent as it is better understood from the following description, which, taken in connection with the accompanying drawing, discloses a preferred embodiment thereof.

Referring to the drawing.

Figure 1:
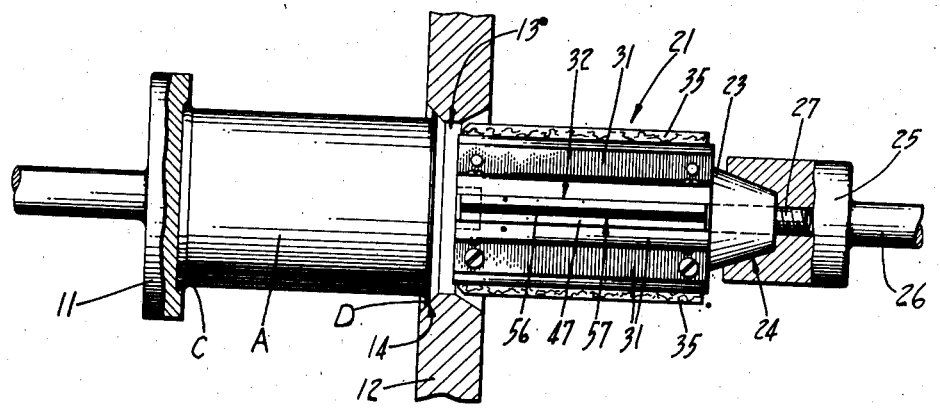
Figure 1 is a longitudinal section of a can cleaning device embodying the instant invention, with parts broken away, the view also illustrating a can in place to be operated upon.

As a preferred embodiment of the instant invention the drawing illustrates a cleaning device for removing solder pellets and flux from the inside enameled surface of the body of a cylindrical sheet metal can A. The can may be of any conventional type, known in the art as a "sanitary" can having a bottom B secured to one end in a suitable end seam C and having a flange D formed on the opposite end of the body for the reception of a top after the can is filled with its contents.

The can A to be cleaned is preferably clamped by a movable pad 11 (Fig. 1) against a support plate 12 with the mouth or open end of the can against the plate and adjacent an opening 13 in the plate. The opening is preferably slightly larger than the inside diameter of the can and the plate adjacent the opening is preferably formed with a beveled surface or seat 14 against which the flange D of the can is clamped.

The clamping pad 11 may be axially movable relative to the can while the plate 12 is preferably stationary relative to the can although these parts may be portions of an automatic machine in which the clamping pad, the can, and the plate may rotate around an axis or may be otherwise movable to perform the can holding, conveying or advancing operation as desired.

In any case the can A to be cleaned is in endwise or axial alignment with a rotating head or brush element generally indicated by the numeral 21 and disposed on the opposite side of the plate 12 as shown in Fig. 1. This head preferably includes a cylindrical spider-shaped, elongated head body 22 having a tapered hub 23 which fits into a tapered seat 24 in the end of an enlarged portion 25 of a rotatable spindle 26. The spindle may be rotated in any suitable manner.

The head body 22 is held in place on the spindle by a long bolt 27 which extends through a clearance hole 28 in the center of the head body. The inner end of the bolt is threaded into the enlarged end of the spindle.

The spider shaped head body 22 is formed with four radial leg sections 31 spaced ninety degrees apart to leave clearance space between them and their outside surfaces are curved so that the head as a unit will readily fit into the can A. Each of the leg sections 31 is formed with a radial slot 32 which extends parallel with the axis of the head for its full length.

Two oppositely disposed spider legs 31 carry relatively soft quills 35 in their slots 32. The quills are preferably made of felt and extend for nearly the full length of the head body 22 and project outwardy beyond the spider legs so that the diametrical dimension across the head on the outside of the two quills is slightly greater than the inside diameter of the can A. The quills are retained in place by screws 37 which extend through both sides of each spider leg and through larger diameter clearance holes 38 in the quill. The inner or bottom surface of the quills are backed up by a thin spring steel supporting plate 41. The quills are pressed outwardly by a pair of compression springs 42 which are located in the leg slots 32 and which are interposed between the supporting plate and the head body. The springs are disposed in seats 43 formed in the head body adjacent each end thereof.

Figure 3:
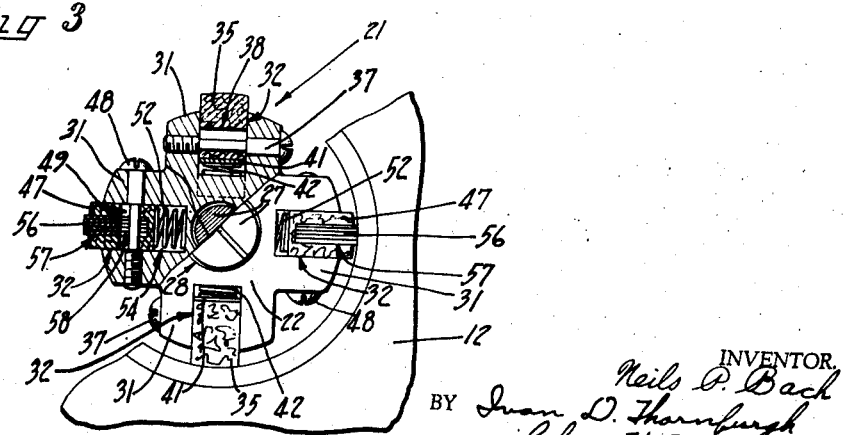
Fig. 3 is an enlarged composite end elevation and sectional view of the device in Fig. 1, with parts broken away.

In a similar manner the remaining two spider legs 31 carry fibrous quills 47 (Fig. 3) in their slots 32. These quills are retained in the slots by screws 48 which extend through both sides of the leg and through enlarged clearance holes 49 in the quills. There are two of these screws in each quill and they are located one adjacent each end of the quill. Two spaced compression springs 52 interposed between the bottom of each quill and the bottom of their respective slots force the quills outwardly against the shanks of the screws 48. The springs are preferably located in seats 54 formed in the head body in the same manner as the spring seats 43 hereinbefore mentioned in connection with the felt quills 35.

Figure 2:
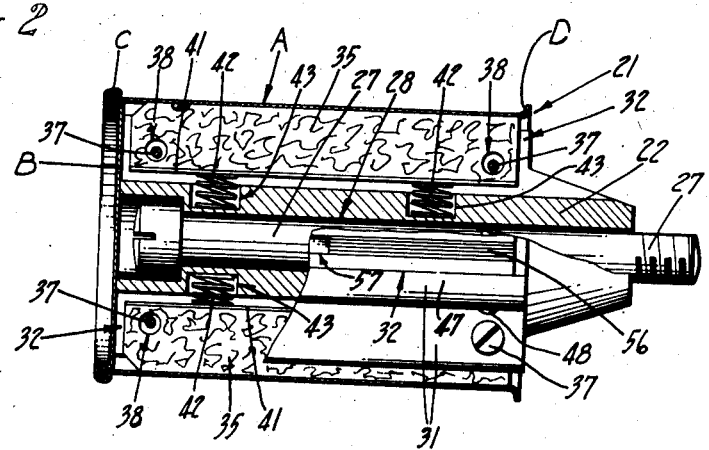
Fig. 2 is an enlarged sectional view of a can cleaning head inserted within a can, with parts broken away.

Each fibre quill 47 preferably carries a laminated and relatively hard cleaning blade 56 which projects beyond the outer surface of the quill and which extends the full length of the quill. These blades are made from a plurality of thin members arranged side by side and are disposed in a deep groove 57 (see also Fig. 2) formed in the fibre quills. The blade members are retained in place by the screws 48 and enlarged clearance holes 58 are formed in them to permit the screws to extend therethrough.

The blade members are preferably made of cellulose acetate although other materials such as wood, fibre and metal in various thicknesses have also been used. However, it has been found that the cellulose acetate blades are preferable because they will not break or crumble and because the loosened solder pellets will not be embeded in them.

Hence when a can A to be cleaned is in clamped position against the holding plate 12, the rotating head unit or brush 21 is pushed through the clearance hole 13 in the plate and is inserted into the can. The entering corners of the quills 35, 47 and the blades 56 are preferably beveled to facilitate their entrance into the can.

As the head rotates, the compression springs 52 force the cleaning blades 56 outwardly, gently against the inside surface of the can with a scraping or sweeping action that dislodges any solder pellets in the can. These released solder pellets are received in the clearance spaces between the spider legs and thus prevent scratching of the can wall or any coating that may be on the wall. In a similar manner the felt quills 35 are forced outwardly against the inside surface of the can by their compression springs 42. The felt quills wipe off the inside of the can body and thereby remove any accumulated dirt, flux, or other such foreign matter.

Such a cleaning head quickly and efficiently frees the inside of the can body from all undesirable matter. With such a construction of head the felt quills and cleaning blades may be easily removed and replaced when they become worn or if desired the entire head unit may be replaced by loosening the main bolt 27 and thus changes may be quickly effected without tying up the entire machine of which such heads may be a part.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A cleaning device for dislodging solder pellets from the inside surface of container bodies, comprising in combination, a head body insertable into a container to be cleaned, a blade comprising a plurality of cellulose acetate laminations yieldably carried in said head body and bodily movable relative thereto, said blade projecting beyond the outer surface of said body and engaging against the inner surface of the container body with a sweeping action when rotative movement between the container and said head body is effected, and spring means carried by said head body engaging said blade for normally urging the same bodily radially outwardly relative to said head body.

2. A cleaning device for dislodging solder pellets from the inside surface of container bodies, comprising in combination, a head body insertable into a container to be cleaned, a longitudinal quill disposed in yieldable relation to and within said head body and bodily movable relative thereto, a laminated blade carried in said quill and projecting beyond its outer surface and engaging against the inner surface of the container body with a sweeping action when rotative movement between the container and said head body is effected, and spring means carried by said head body engaging said quill for normally urging said blade bodily radially outwardly relative to said head body into cleaning engagement with the interior surface of said container bodies.

3. A cleaning device for dislodging solder pellets from the inside surface of container bodies, comprising in combination, a head body insertable into a container to be cleaned, a quill yieldably disposed in said head body and movable bodily relative thereto, a blade carried in said quill and projecting beyond its outer surface and engaging against the inner surface of the container body with a sweeping action when rotative movement between the container and said head body is effected, and spring means carried by said head body engaging said quill for normally urging said blade bodily radially outwardly relative to said head body.

4. A cleaning device for dislodging solder pellets and for wiping out the inside of container bodies, comprising in combination, a head body insertable into a container to be cleaned, a relatively hard scraper blade yieldably carried in said head body and bodily movable relative thereto, said scraper blade engaging against the inner surface of the container body with a sweeping action for dislodging solder pellets from the container body, a relatively soft quill also yieldably carried in said head body in spaced relation to said blade for simultaneously wiping the inner surface of the container body, and spring devices carried by said head body engaging said blade and said quill for normally urging the same bodily radially outwardly relative to said head body.

5. A cleaning device for dislodging solder pellets and for wiping out the inside of container bodies, comprising in combination, a rotatable head body insertable into a container to be cleaned, a pair of relatively hard scraper blades yieldably carried in said head body and bodily movable relative thereto, said blades being located one on each side thereof in radial fashion and engaging against the inner surface of the container body with a sweeping action for dislodging solder pellets from the container body, a pair of relatively soft quills also yieldably carried in said head body and located one on each side thereof in radial fashion intermediate said blades for wiping the inner surface of the container body, and spring means carried by said head body engaging said scraper blades and said quills for normally urging the same radially bodily outwardly relative to said head body into cleaning engagement with the interior of the container bodies.

6. A cleaning device for dislodging solder pellets and for wiping out the inside of container bodies, comprising in combination, a rotatable spindle, a cylindrical spider shaped head body removably secured to said spindle and insertable into a container to be cleaned, a plurality of scraping blades removably and yieldably disposed in said head and bodily movable relative thereto, a plurality of wiping quills also removable and yieldably disposed in said head, said blades and said quills being arranged in alternate positions around the head for dislodging solder pellets from the inside surface of the container body and for simultaneously wiping the inside surface of the container body as the head body rotates, said head body having clearance spaces between the blades and the quills to receive the solder pellets dislodged by said blades, and spring means carried by said head body engaging said scraping blades and said quills for normally urging the same radially bodily outwardly relative to said head body into engagement with the interior of the container bodies to be cleaned.

NEILS P. BACH.